(12) United States Patent
Enta

(10) Patent No.: US 9,746,690 B2
(45) Date of Patent: Aug. 29, 2017

(54) ACTUATOR, CAMERA MODULE, AND MOBILE TERMINAL WITH CAMERA

(71) Applicant: Yohei Enta, Tokyo (JP)

(72) Inventor: Yohei Enta, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 0 days.

(21) Appl. No.: 15/305,868

(22) PCT Filed: Apr. 22, 2015

(86) PCT No.: PCT/JP2015/002184
§ 371 (c)(1),
(2) Date: Oct. 21, 2016

(87) PCT Pub. No.: WO2015/162917
PCT Pub. Date: Oct. 29, 2015

(65) Prior Publication Data
US 2017/0045753 A1 Feb. 16, 2017

(30) Foreign Application Priority Data
Apr. 25, 2014 (JP) .................. 2014-091874

(51) Int. Cl.
*G02B 27/64* (2006.01)
*G03B 13/36* (2006.01)
(Continued)

(52) U.S. Cl.
CPC ............ *G02B 27/646* (2013.01); *G02B 7/04* (2013.01); *G03B 5/00* (2013.01); *G03B 13/36* (2013.01);
(Continued)

(58) Field of Classification Search
CPC ........ G02B 27/646; G03B 5/00; G03B 13/36; H04N 5/2254; H04N 5/2257; H04N 5/23251; H04N 5/23264
(Continued)

(56) References Cited

FOREIGN PATENT DOCUMENTS

| JP | 2011-027947 A | 2/2011 |
|---|---|---|
| JP | 2014-010287 A | 1/2014 |

OTHER PUBLICATIONS

JP 2011-027947 translation.*
International Search Report from International Application No. PCT/JP2015/002184 mailed Jul. 21, 2015.

* cited by examiner

*Primary Examiner* — Rochelle-Ann J Blackman
(74) *Attorney, Agent, or Firm* — Brundidge & Stanger, P.C.

(57) ABSTRACT

This actuator carries out shake correction by inclining a driven unit using the driving force of a voice coil motor having a coil portion and a magnet portion. The actuator is provided with: a movable portion that has a flat frame-like holding member to which the driven unit is adhered, wherein one of either the coil portion or the magnet portion is disposed in the holding member; a fixed portion that has a base member and a frame-like cover member that is fixed to the peripheral edge of the base member, wherein the other of either the coil portion or the magnet portion is disposed in the base member; and a support portion that is disposed in the base member and supports the movable portion so as to be inclinable relative to the fixed portion. The movable portion is sandwiched between the base member and the cover member.

11 Claims, 8 Drawing Sheets

(51) Int. Cl.
*G03B 5/00* (2006.01)
*H04N 5/225* (2006.01)
*H04N 5/232* (2006.01)
*G02B 7/04* (2006.01)

(52) U.S. Cl.
CPC ........... *H04N 5/225* (2013.01); *H04N 5/2254* (2013.01); *H04N 5/2257* (2013.01); *H04N 5/23251* (2013.01); *H04N 5/23264* (2013.01); *G03B 2205/0023* (2013.01)

(58) Field of Classification Search
USPC .......................................................... 396/53
See application file for complete search history.

ACTUATOR, CAMERA MODULE, AND MOBILE TERMINAL WITH CAMERA

TECHNICAL FIELD

The present invention relates to a hand-shake correction actuator, a camera module having a hand-shake correction function, and a camera-equipped mobile terminal.

BACKGROUND ART

In general, a small-sized camera module is mounted in mobile terminals such as a smartphone. Such a module often has an auto-focusing function for automatically focusing at the time of capturing a subject and a hand-shake correction function (OIS: Optical Image Stabilization) for reducing irregularities of an image by correcting hand shake (vibration) caused at the time of capturing an image. As the hand-shake correction method, a module tilt method is known in which an imaging module is integrally tilted (for example PTL 1). The imaging module is a module having a lens part and an imaging device (for example, a charge coupled device (CCD)), which may be provided with an auto-focusing actuator.

In the following descriptions, the auto-focusing actuator is referred to as "AF actuator," and the hand-shake correction actuator is referred to as "OIS actuator."

FIG. 1 illustrates an example of an external appearance of a camera module of a conventional module tilt type. FIG. 2 is an exploded perspective view of an example of a camera module of a conventional module tilt type.

As illustrated in FIGS. 1 and 2, camera module 2 of a conventional module tilt type includes fixing part 21, movable part 22, elastic supporting part 23, imaging module 24, and shake detection part 25. An OIS actuator is composed of fixing part 21, movable part 22, and elastic supporting part 23.

Fixing part 21 includes base member 211, coil part 212, and OIS print wiring board 213. Coil part 212 is disposed to base member 211. OIS print wiring board 213 feeds power to coil part 212, and outputs a detection signal of shake detection part 25 to a control part.

Movable part 22 includes yoke 221, magnet part 222, top plate 223, and module guide 224. Yoke 221 and magnet part 222 are disposed to respective housing parts formed in top plate 223. Module guide 224 is fixed to top plate 223. Imaging module 24 is disposed and fixed in a space sandwiched between a pair of module guides 224.

Elastic supporting part 23 has a biaxial gimbal mechanism, and movable part 22 (top plate 223) is fixed to an outer gimbal. Elastic supporting part 23 is disposed at an approximate center of base member 211 in a floating fashion, and fixed by stopper 231. Elastic supporting part 23 supports movable part 22 such that movable part 22 can rotationally sway around the X axis and the Y axis orthogonal to the optical axis (Z axis), that is, elastic supporting part 23 supports movable part 22 such that movable part 22 can be tilted.

Shake detection part 25 is composed of a gyro sensor that detects the angular velocity of imaging module 24, for example. Shake detection part 25 is fixed to a side surface of module guide 224 of movable part 22. The detection signal of shake detection part 25 is output to the control part through OIS print wiring board 213 that is fixing part 21.

An OIS voice coil motor (VCM) is composed of coil part 212 and magnet part 222. That is, when a current flows through coil part 212, a Lorentz force is generated at coil part 212 with interaction between the magnetic field of magnet part 222 and a current flowing through coil part 212 (Fleming's left hand rule). Since coil part 212 is fixed, a reactive force is exerted on magnet part 222. This reactive force is the driving force of the OIS voice coil motor. Movable part 22 rotationally sways until the driving force of the OIS voice coil motor and the restoration force (returning force) of elastic supporting part 23 become equivalent to each other. In this manner, shift of the optical axis due to hand shake is corrected, and the orientation of the light axis is kept at an orientation.

CITATION LIST

Patent Literature

PTL 1
Japanese Patent Application Laid-Open No. 2014-10287

SUMMARY OF INVENTION

Technical Problem

In recent years, along with thickness reduction of mobile terminals, further height reduction of camera modules has been desired. However, the above-described conventional structure uses top plate 223, module guide 224, stopper 231 and the like for the purpose of positioning and fixation, and therefore cannot achieve further height reduction.

An object of the present invention is to provide an actuator which can achieve further height reduction, and provide a camera module and a camera-equipped mobile terminal which include the actuator.

Solution to Problem

An actuator according to an embodiment of the present invention corrects shake by tilting a driven part with a driving force of a voice coil motor including a coil part and a magnet part, and includes: a movable part including a holding member having a flat frame shape on which the driven part is bonded, and one of the coil part and the magnet part disposed to the holding member; a fixing part including a base member, a cover member having a frame shape fixed to a peripheral portion of the base member, and the other of the coil part and the magnet part disposed to the base member; a supporting part disposed to the base member, and configured to support the movable part such that the movable part is allowed to be tilted with respect to the fixing part. The movable part is tightly sandwiched between the base member and the cover member.

A camera module according to an embodiment of the present invention includes: the above-mentioned actuator; an imaging module including a lens part and an imaging device, and bonded to the holding member as the driven part; and a shake detection part configured to detect shake of the imaging module.

A camera-equipped mobile terminal according to an embodiment of the present invention includes the above-mentioned camera module.

Advantageous Effects of Invention

According to the present invention, the number of components is small in comparison with the conventional technique, and therefore it is possible to achieve further height reduction and facilitation of assembling processes.

DESCRIPTION OF EMBODIMENT

In the following, an embodiment of the present invention is described in detail with reference to the drawings.

Figure 3A:
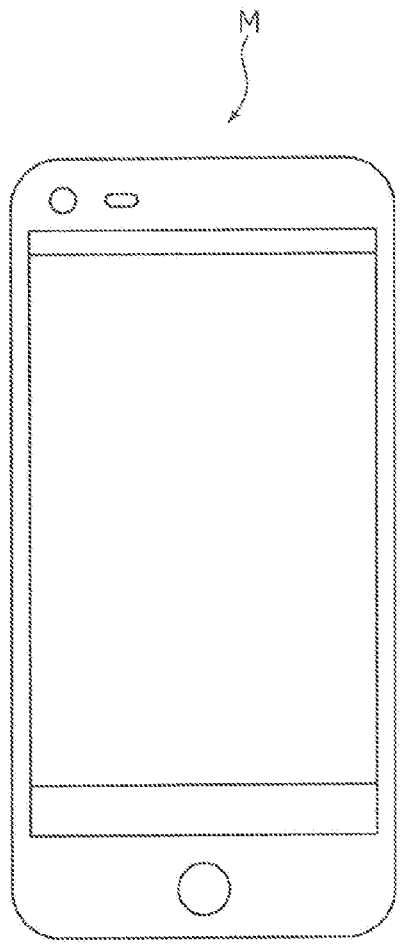
FIGS. 3A and 3B illustrate smartphone M in which camera module 1 according to an embodiment of the present invention is mounted.
Figure 3B:
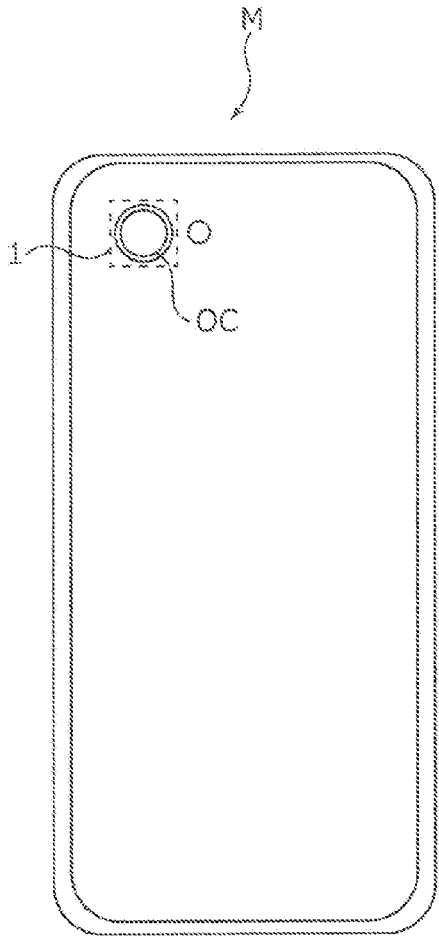

FIGS. 3A and 3B illustrate smartphone M in which camera module 1 according to an embodiment of the present invention is mounted. FIG. 3A is a front view of smartphone M, and FIG. 3B is a rear view of smartphone M.

For example, smartphone M is provided with camera module 1 as a back side camera OC. Camera module 1 has an auto-focusing function and a hand-shake correction function, and can capture an image without image blurring by automatically performing focusing at the time of capturing a subject and by correcting hand shake (vibration) caused at the time of capturing an image. The hand-shake correction function of camera module 1 is of a module tilt type. The module tilt type is advantageous in that no deformation is caused at four corners of the screen.

Figure 4:
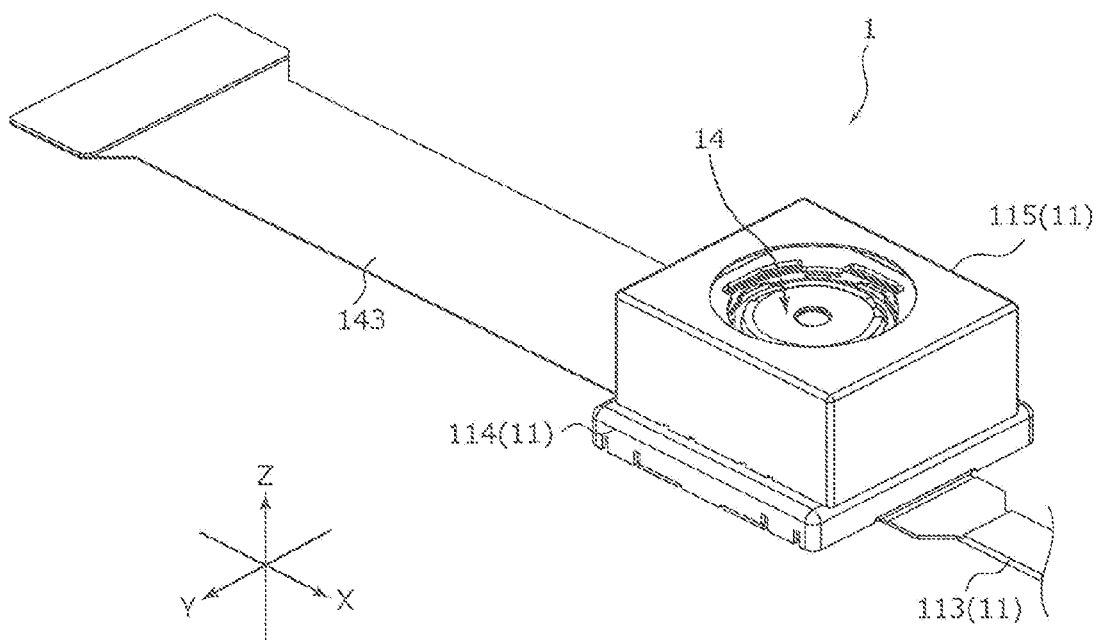
FIG. 4 is a perspective view of an external appearance of the camera module.
Figure 5:
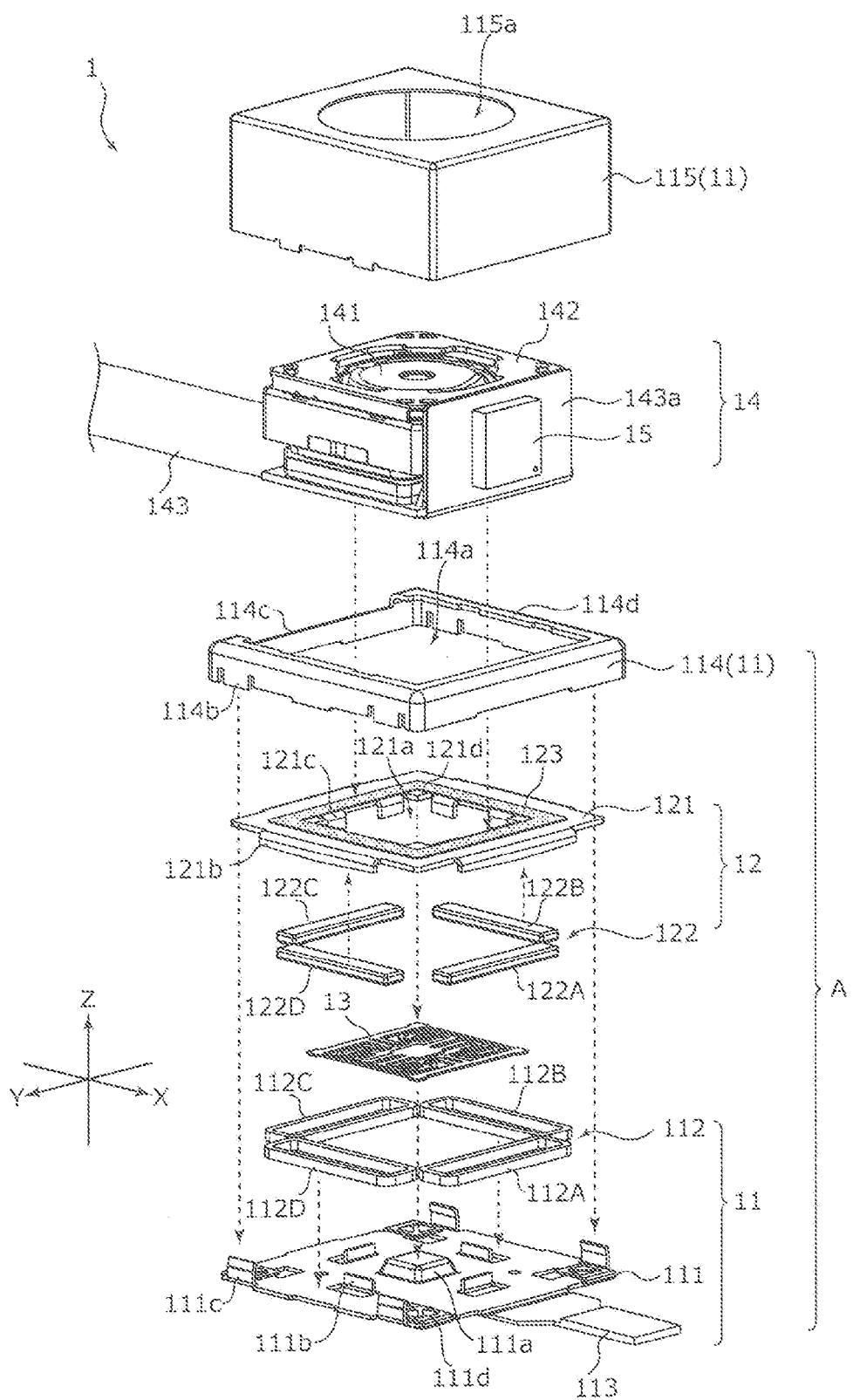
FIG. 5 is an exploded perspective view of the camera module.
Figure 6:
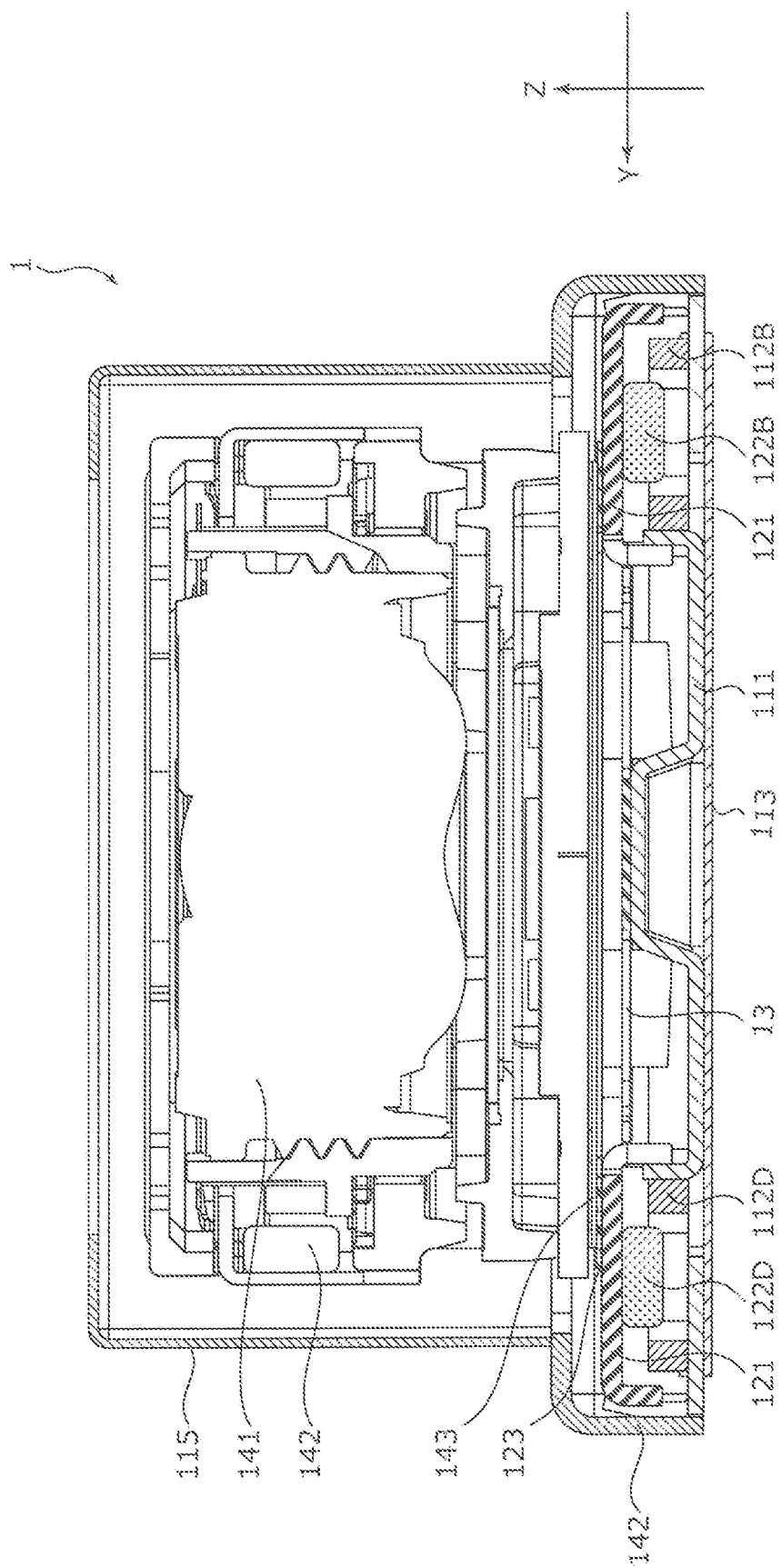
FIG. 6 is a sectional view along the Y direction of the camera module.
Figure 7:
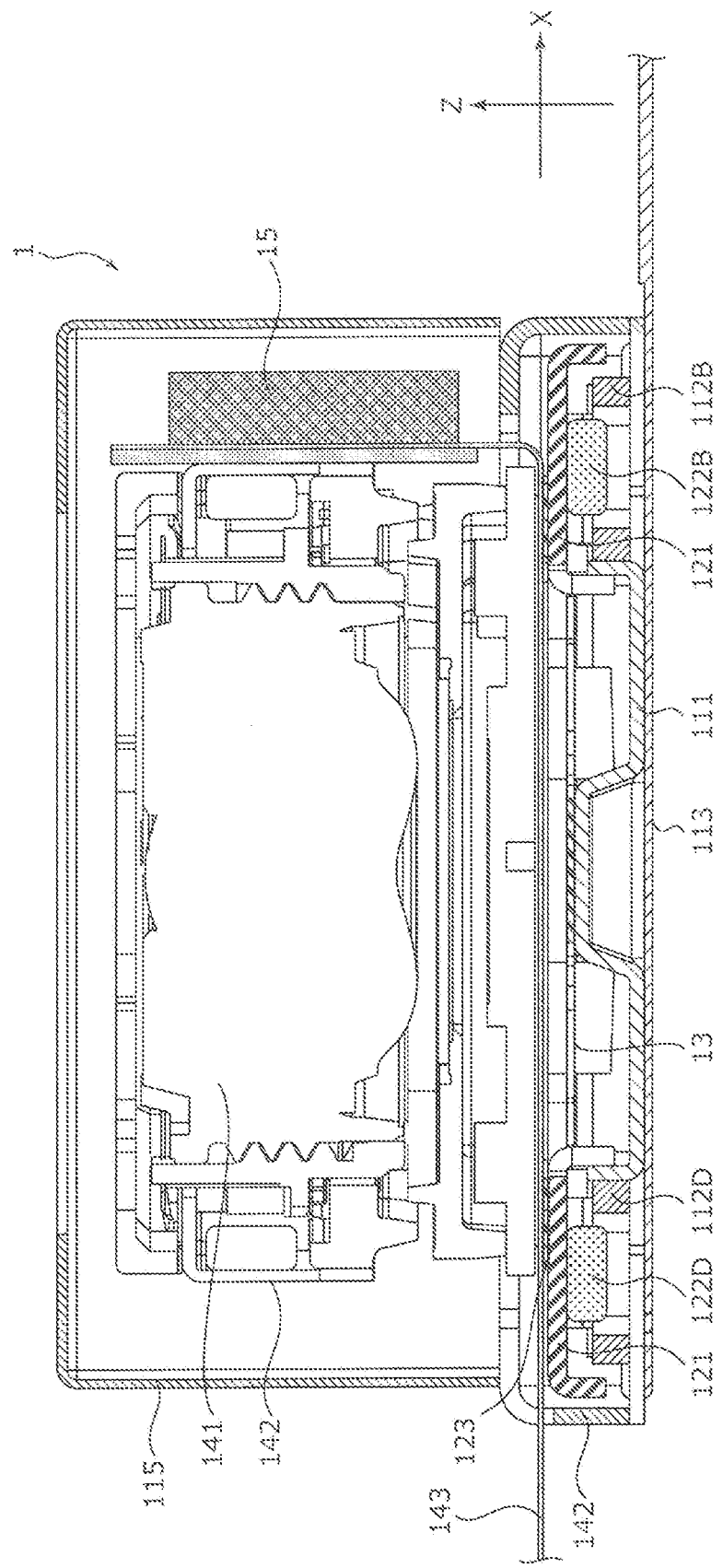
FIG. 7 is a sectional view along the X direction of the camera module.

FIG. 4 is a perspective view of an external appearance of camera module 1. FIG. 5 is an exploded perspective view of camera module 1. FIG. 6 is a sectional view of camera module 1 along the Y direction. FIG. 7 is a sectional view of camera module 1 along the X direction.

Here, as illustrated in FIG. 4 to FIG. 7, descriptions will be made with an orthogonal coordinate system (X, Y, Z). Camera module 1 is mounted such that the vertical direction (or horizontal direction) is the X direction, the horizontal direction (or vertical direction) is the Y direction, and the front-rear direction is the Z direction at the time of actually capturing an image with smartphone M.

As illustrated in FIG. 4 to FIG. 7, camera module 1 includes fixing part 11, movable part 12, elastic supporting part 13, imaging module 14, shake detection part 15 and the like. OIS actuator A is composed of fixing part 11, movable part 12, and elastic supporting part 13. In OIS actuator A, hand-shake correction is performed with use of the driving force of an OIS voice coil motor including coil part 112 and magnet part 122.

Fixing part 11 is fixed so as to be unmovable when mounted in smartphone M. Fixing part 11 includes base member 111, coil part 112, OIS print wiring board 113, skirt member 114, and cover member 115.

Base member 111 is a member formed of a metal material in a substantially rectangular shape. Base member 111 is formed of a metal, and as a result the strength is high in comparison with the case where base member 111 is formed of a resin. Thus the thickness of base member 111 can be reduced, and in turn, reduction of the height of camera module 1 can be achieved.

Base member 111 includes, at the center thereof, protruding part 111a having a truncated pyramid shape for fixing elastic supporting part 13. Base member 111 includes, at positions around protruding part 111a, upright pieces 111b for setting the position of coil part 112. Base member 111 includes, at respective both end portions of the peripheral portions along the X direction, lock pieces 111c for fixing skirt member 114. Lock pieces 111c generate an outward biasing force in the Y direction when skirt member 114 is attached to base member 111. Base member 111 includes, at the four corners thereof, power feeding pads 111d for supplying electricity to coil part 112.

Coil part 112 is composed of four tilt coils 112A to 112D and is disposed at base member 111 to surround protruding part 111a. The position of coil part 112 is set with upright pieces 111b of base member 111. Power is fed to coil part 112 through power feeding pad 111d.

Tilt coils 112A and 112C face each other in the X direction, and tilt coils 112A and 112C are used to rotationally sway movable part 12 around the Y axis. Tilt coils 112B and 112D face each other in the Y direction, and tilt coils 112B and 112D are used to rotationally sway movable part 12 around the X axis.

OIS print wiring board 113 includes a power-source line (not illustrated) for feeding power to coil part 112. OIS print wiring board 113 is fixed on the bottom surface of base member 111, and the power-source line is electrically connected with power feeding pad 111 of base member 111.

Skirt member 114 is a frame-shaped member composed of four walls coupled with each other in a rectangular shape, and includes reception port 114a for imaging module 14. Skirt member 114 includes lock parts 114b at positions corresponding to lock pieces 111c of base member 111. The upper part of the wall of one side of skirt member 114 is cut out, and is used as drawing part 114c for pulling out print wiring board 143 of imaging module 14. The upper parts of the remaining three side walls of skirt member 114 are formed to slightly protrude toward the inside, and serve as restriction part 114d for preventing movable part 12 from being excessively tilted.

Skirt member 114 is fixed to the peripheral portion of base member 111 after movable part 12 is attached to base member 111 through elastic supporting part 13. Movable part 12 is tightly sandwiched between base member 111 and skirt member 114.

Cover member 115 is a capped rectangular cylindrical member. Cover member 115 includes, at the top surface thereof, opening 115a through which lens part 141 of imaging module 14 faces outside. Cover member 115 is fixed to skirt member 114 after OIS actuator A is mounted to imaging module 14.

Movable part 12 rotationally sways around the X axis and the Y axis with respect to fixing part 11. Movable part 12 includes yoke 121 and magnet part 122. At the time when imaging module 14 is mounted to OIS actuator A, yoke 121 directly holds imaging module 14. Imaging module 14 is bonded on the top surface of yoke 121 with double-sided tape 123, for example. Imaging module 14 may be bonded to yoke 121 with a resin adhesive agent instead of double-sided tape 123.

Even without using positioning members such as the module guide disclosed in PTL 1, imaging module 14 can be fixed to yoke 121 with use of a jig while setting the position of imaging module 14 with high accuracy.

Yoke 121 is a flat-frame shaped member composed of four flat plates which are formed of a magnetic material and are coupled with each other in a rectangular shape. Yoke 121 includes reception port 121a for imaging module 14. Yoke 121 includes outer leg parts 121b formed in a downward eaves shape which are disposed along the outer peripheral edges of respective flat plates. Yoke 121 includes inner leg parts 121c formed in a downward protruding shape which are disposed along the inner peripheral edges of respective flat plates. That is, the cross-sectional shape of one side of yoke 121 partially has a U-shape or an L-shape. In addition, yoke 121 includes, at the four corners of the inner peripheral edge thereof, fixation pieces 121d for fixing elastic supporting part 13.

Magnet part 122 is composed of four cuboid permanent magnets 122A to 122D corresponding to tilt coils 112A to 112D. Electromagnets may be used in place of permanent magnets. Permanent magnets 122A to 122D have a size which can be put inside tilt coils 112A to 112D.

Permanent magnets 122A to 122D are disposed at the bottom surfaces of respective flat plates of yoke 121 such that the magnetization direction is the Z direction, and permanent magnets 122A to 122D are fixed by bonding, for example. With use of a jig, permanent magnets 122A to 122D can be fixed to yoke 121 while setting the positions with high accuracy. Permanent magnets 122A to 122D are located between inner leg part 121c and outer leg part 121b of yoke 121.

In OIS actuator A, coil part 112 is located between yoke 121 and magnet part 122 (see FIGS. 5 to 6). Since the periphery of coil part 112 is covered with yoke 121, it is possible to prevent the AF actuator of imaging module 14 from being unfavorably influenced by the magnetic field of the energization current of coil part 112.

Figure 8:
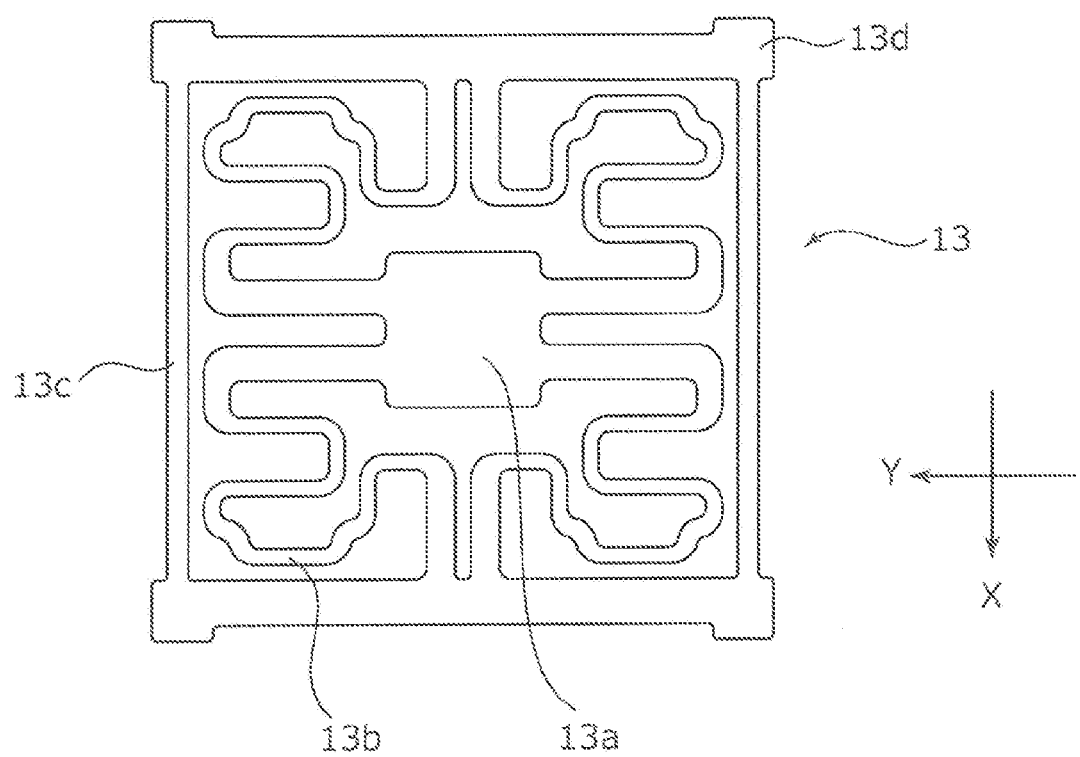
FIG. 8 is a plan view illustrating an elastic supporting part.

Elastic supporting part 13 is composed of a rectangular member having a biaxial gimbal mechanism (so-called gimbal spring). To be more specific, as illustrated in FIG. 8, elastic supporting part 13 includes center portion 13a and outer gimbal 13c continuously connected with center portion 13a with inner gimbal 13b therebetween. Outer gimbal 13c rotationally sways around the X axis and the Y axis. Inner gimbal 13b has a complex curved shape, and outer gimbal 13c has a shape of a rectangular frame.

Center portion 13a of elastic supporting part 13 is bonded or welded to protruding part 111a of base member 111, and fixation pieces 121d of yoke 121 are bonded or welded to protruding pieces 13d at the four corners of outer gimbal 13b. In this manner, movable part 12 is disposed at an approximate center of base member 111 in a floating fashion, and thus can rotationally sway around the X axis and the Y axis. Since elastic supporting part 13 is fixed to base member 111 by bonding, it is not necessary to provide lock members such as the stopper disclosed in PTL 1.

Imaging module 14 includes lens part 141, an imaging device (not illustrated), AF actuator 142, and AF print wiring board 143.

The imaging device (not illustrated) is composed of, for example, a CCD (charge coupled device) image sensor, a CMOS (complementary metal oxide semiconductor) image sensor, or the like. The imaging device (not illustrated) is mounted to AF print wiring board 143. The imaging device (not illustrated) captures a subject image imaged by lens part 141.

AF actuator 142 includes an AF voice coil motor for example, and moves lens part 141 in the light axis direction by utilizing the driving force of AF voice coil motor. Publicly known techniques can be applied to AF actuator 142.

AF print wiring board 143 includes a power-source line (not illustrated) configured to feed power to a coil part (not illustrated) of AF actuator 142, and a video signal line (not illustrated) for video signals output from the imaging device, and a detection signal line (not illustrated) for detection signals output from shake detection part 15.

AF print wiring board 143 is pulled to the outside through drawing part 114c of skirt member 114 in the state where imaging module 14 is mounted in OIS actuator A. Branching may be provided in AF print wiring board 143 to attach different connectors to the video signal line and the detection signal line.

Shake detection part 15 detects shake (movement) of imaging module 14. Shake detection part 15 is composed of a gyro sensor configured to detect the angular velocity of imaging module 14, for example. Shake detection part 15 is mounted to upright part 143a of AF print wiring board 143. The detection signal of shake detection part 15 is output to a control part through AF print wiring board 143. The control part controls the energization current of coil part 112 based on the detection signal.

It is to be noted that the control part (not illustrated) may be mounted to AF print wiring board 143, or the control part mounted in smartphone M may be utilized.

Figure 1:
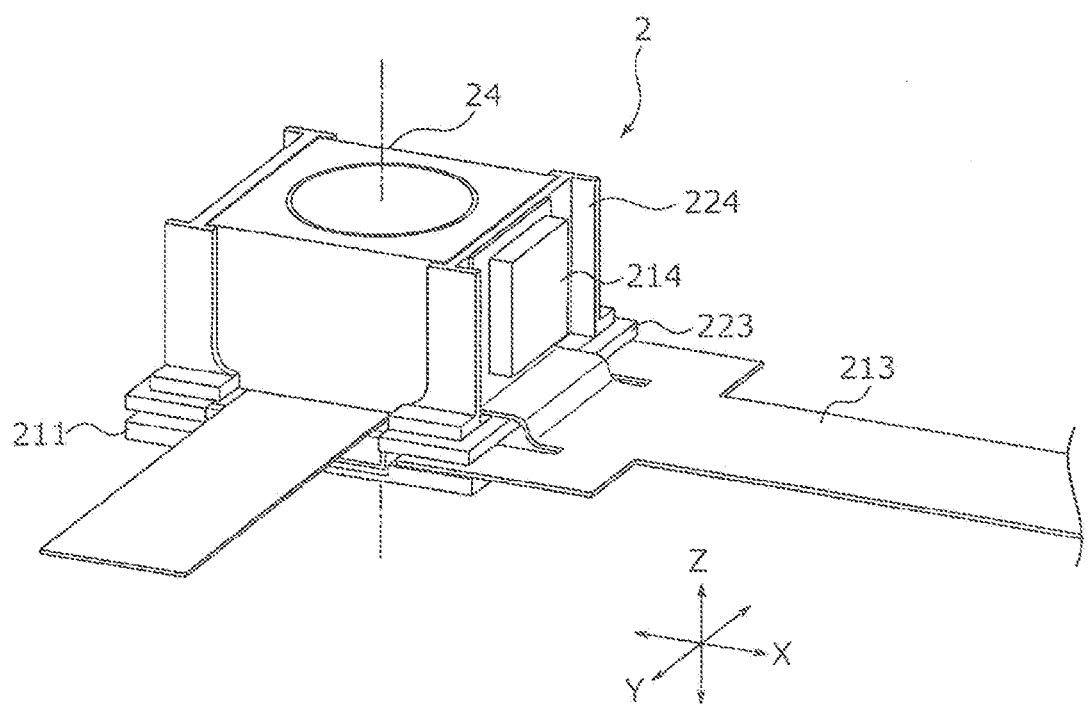
FIG. 1 illustrates an example of an external appearance of a camera module of a conventional module tilt type.
Figure 2:
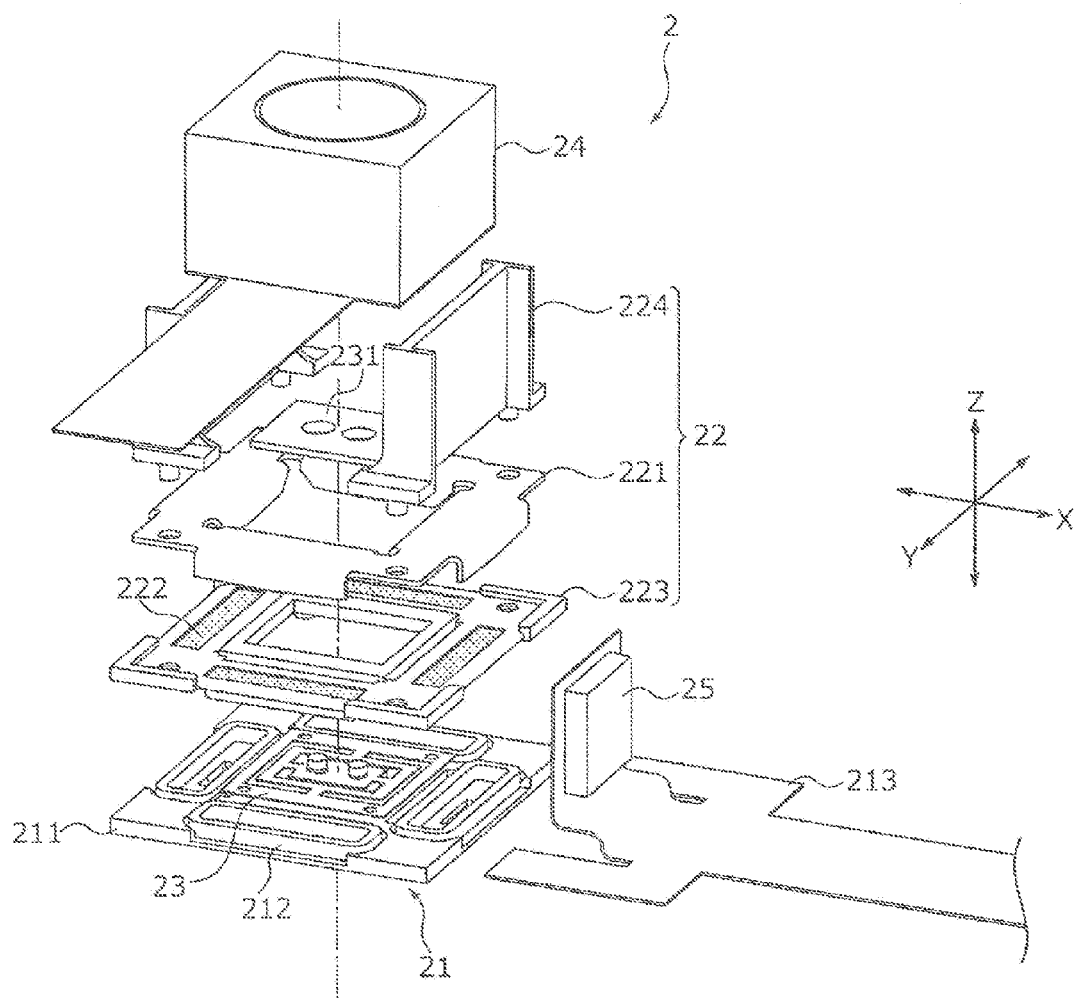
FIG. 2 is an exploded perspective view illustrating an example of a camera module of a conventional module tilt type.

In conventional camera module 2 (see FIGS. 1 to 2), shake detection part 25 is attached to movable part 22 (module guide 224), and the detection signal of shake detection part 25 is output through OIS print wiring board 213 serving as fixing part 21. The rotational sway of movable part 22 is inhibited by OIS print wiring board 213, and the sensitivity of the tilt operation is reduced, and as a result, the driving force of the OIS actuator is inevitably increased.

In contrast, in camera module 1 according to the embodiment, the detection signal of shake detection part 15 is output through AF print wiring board 143 of imaging module 14. That is, OIS print wiring board 113 of fixing part 11 does not inhibit the rotational sway of movable part 12 (imaging module 14). Accordingly, the driving force of OIS actuator A can be reduced in comparison with the conventional technique, and the power consumption can be reduced. In addition, OIS print wiring board 113 of fixing part 11 is used only for power feeding to coil part 112, and therefore may be omitted by separately providing another power-source line. Consequently, cost reduction and space-saving can be achieved.

In OIS actuator A, the OIS voice coil motor is composed of coil part 112 and magnet part 122. In an initial state where no current flows through coil part 112, imaging module 14 (movable part 12) is held at a neutral position where the optical axis coincides with the Z direction.

When a current flows through coil part 112, a Lorentz force in the Z direction is generated at coil part 112 with interaction between the magnetic field of magnet part 122 and the current flowing through coil part 112 (Fleming's left hand rule). Since coil part 112 is fixed, a reactive force is exerted on magnet part 122 which is movable part 12. This reactive force is the driving force of the OIS voice coil motor.

To be more specific, when opposite currents are supplied to tilt coils 112A and 112C facing each other in the X-axis direction, opposite forces in the Z direction act on permanent magnets 122A and 122C. Accordingly, movable part 12 including imaging module 14 rotationally sways around the Y axis with center portion 13a of elastic supporting part 13 as a fulcrum.

Likewise, when opposite currents are supplied through tilt coils 112B and 112D facing each other in the Y-axis direction, movable part 12 including imaging module 14 rotationally sways around the X axis with center portion 13a of elastic supporting part 13 as a fulcrum.

Movable part 12 rotationally sways until the driving force of the OIS voice coil motor (force which acts on magnet part 122) and the restoration force of elastic supporting part 13 become equivalent to each other.

At this time, the energization current of coil part 112 is controlled based on the detection result of shake detection part 15 such that rotational sway of movable part 12 offsets shake of imaging module 14. In this manner, the shift of the optical axis due to hand shake is corrected, and the orientation of the light axis is kept at an orientation.

In addition, since restriction part 114d of skirt member 114 limits the rotational sway of movable part 12, it is possible to prevent movable part 12 from being excessively rotationally swayed by the drop impact or the like.

As described, actuator A corrects shake by tilting the driven part (imaging module 14) with the driving force of the voice coil motor including coil part (112) and magnet part (122). Actuator A includes: movable part (12) in which a holding member (yoke 121) having a flat frame shaped on which the driven part (imaging module 14) is bonded is provided and magnet part (122) is disposed to holding member (121); fixing part (11) in which base member (111) and a cover member (skirt member 114) having a frame shape fixed to a peripheral portion of base member (111) are provided and coil part (112) is disposed to base member (111); and a supporting part (elastic supporting part 13) disposed to base member (111) and configured to support movable part (12) such that movable part (12) can be tilted with respect to fixing part (11). Movable part (12) is tightly sandwiched between base member (111) and cover member (114).

With actuator A, the number of components is reduced in comparison with the conventional techniques, and consequently further height reduction and facilitation of assembling processes are achieved. In addition, camera module 1 is obtained by only bonding imaging module 14 with an auto-focusing function to yoke 121.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, while the actuator of the embodiment is of a so-called moving magnet type in which fixing part 11 includes coil part 112 and movable part 12 includes magnet part 122, the present invention may be applied to an actuator of a so-called moving coil type in which a fixing part includes a magnet part and a movable part includes a coil part. In this case, the yoke is also disposed to the fixing part.

While, in the embodiment, two pairs of tilt coil 112A and permanent magnet 122A and tilt coil 112C and permanent magnet 122C are disposed as the voice coil motor that rotationally sways movable part 12 around the X axis, and two pairs of tilt coil 112B and permanent magnet 122B and tilt coil 112D and permanent magnet 122D are disposed as the voice coil motor that rotationally sways movable part 12 around the Y axis, it suffices that at least one pair is disposed as each of the voice coil motors.

In addition, as shake detection part 15, photo reflectors, magnetic sensors, inductance detection with a coil, strain sensors and the like may also be adopted as well as gyro sensors. In the case where a detection device (for example a photodetector of a photo reflector, a Hall device of a magnetic sensor or the like) is disposed to the movable part, it is preferable to output a detection signal through a print wiring board of an imaging module.

In addition, preferably, each component (in particular, magnet part 122) of actuator A is formed of a highly heat-resistant material. In this manner, soldering of a reflow type can be employed.

In addition, as a countermeasure against noise, a conductive shield case may be provided on the outside of camera module 1.

While a smartphone is described in the embodiment as an example of the camera-equipped mobile terminal, the present invention is also applicable to camera-equipped mobile phones, note-type personal computers, tablet terminals, mobile game machines, webcameras, in-vehicle cameras and the like.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof. Although embodiments of the present invention has been described and illustrated in detail, it is clearly understood that the same is by way of illustrated and example only and is not to be taken by way of limitation, the scope of the present invention being interpreted by terms of the appended claims.

This application is entitled to and claims the benefit of Japanese Patent Application No. 2014-091874 dated Apr. 25, 2014, the disclosure of which including the specification, drawings and abstract is incorporated herein by reference in its entirety.

REFERENCE SIGNS LIST

1 Camera module
11 Fixing part
111 Base member
112 Coil part
113 Print wiring board
114 Skirt member (cover member)
115 Cover member
12 Movable part
121 Yoke (holding member)
122 Magnet part
123 Double-sided tape
13 Elastic supporting part (supporting part)
14 Imaging module (driven part)
141 Lens part
142 AF actuator
143 AF print wiring board
15 Shake detection part
A Actuator
M Smartphone (camera-equipped mobile terminal)

The invention claimed is:

1. An actuator that corrects shake by tilting a driven part with a driving force of a voice coil motor including a coil part and a magnet part, the actuator comprising:
   a movable part including a holding member having a flat frame shape on which the driven part is bonded, and one of the coil part and the magnet part disposed to the holding member;
   a fixing part including a base member, a cover member having a frame shape fixed to a peripheral portion of the base member, and the other of the coil part and the magnet part disposed to the base member;
   an elastic supporting member disposed to the base member, and configured to elastically support the movable part such that the movable part is allowed to be tilted with respect to the fixing part, wherein:
   the movable part is interposed between the base member and the cover member,
   the elastic supporting member comprises a combination of a center portion, an inner gimbal and an outer gimbal that forms a biaxial gimbal mechanism having two rotational axes orthogonal to a light axis direction of the drive part and to each other,
   the center portion is fixed to the base member,
   the outer gimbal is fixed to the holding member,
   the inner gimbal comprises a plurality of arms formed separately from each other and provided between the center portion and the outer gimbal to connect the center portion and the outer gimbal, and
   each of the plurality of arms comprises:
      a first linear portion that extends outwardly from the center portion and linearly along one rotational axis;
      a second linear portion that extends inwardly from the outer gimbal and linearly along another rotational axis; and
      a curved portion that extends in a curved manner to connect the first linear portion and the second linear portion.

2. The actuator according to claim 1, wherein:
   the magnet part is disposed to the holding member; and
   the coil part is disposed to the base member.

3. The actuator according to claim 2, wherein the holding member is a yoke formed of a magnetic material.

4. The actuator according to claim 1, wherein:
   the coil part is disposed to the holding member; and
   the magnet part is disposed to the base member.

5. A camera module comprising:
   the actuator according to claim 1;
   an imaging module including a lens part and an imaging device, and bonded to the holding member as the driven part; and
   a shake detection part configured to detect shake of the imaging module.

6. The camera module according to claim 5, wherein:
   the shake detection part includes a detection device attached to the movable part or the imaging module; and
   a detection signal of the detection device is output through a print wiring board of the imaging module.

7. The camera module according to claim 6, wherein the shake detection part is composed of a gyro sensor configured to detect an angular velocity of the imaging module.

8. The camera module according to claim 5 further comprising:
   a control part configured to control power feeding to the coil part based on a detection signal output from the shake detection part.

9. The camera module according to claim 5, wherein the imaging module has an auto-focusing function.

10. A camera-equipped mobile terminal comprising:
    the camera module according to claim 5.

11. The actuator according to claim 1, wherein:
    the curved portion is formed by alternately arranging a plurality of first parallel portions that extends parallel with the first linear portion and a plurality of second parallel portion that extends parallel with the second linear portion.

* * * * *